(12) United States Patent
Yang (10) Patent No.: US 10,774,821 B2
(45) Date of Patent: Sep. 15, 2020

(54) PORTABLE INFLATION DEVICE

(71) Applicant: Universal Trim Supply Co., Ltd., New Taipei (TW)

(72) Inventor: Shih-Sheng Yang, Taipei (TW)

(73) Assignee: Universal Trim Supply Co., Ltd., New Taipei (TW)

( * ) Notice: Subject to any disclaimer, the term of this patent is extended or adjusted under 35 U.S.C. 154(b) by 163 days.

(21) Appl. No.: 16/133,709

(22) Filed: Sep. 18, 2018

(65) Prior Publication Data

US 2019/0346052 A1 Nov. 14, 2019

(30) Foreign Application Priority Data

May 10, 2018 (CN) .......................... 2018 1 0442747

(51) Int. Cl.
*F16K 13/00* (2006.01)
*F04B 33/00* (2006.01)
(Continued)

(52) U.S. Cl.
CPC .............. *F04B 33/00* (2013.01); *F16K 13/00* (2013.01); *A41D 27/00* (2013.01); *A43B 3/248* (2013.01);
(Continued)

(58) Field of Classification Search
CPC ...... F04B 33/00; F04B 33/005; F04B 39/122; F04B 39/121; F04B 53/10; F04B 53/1072;
(Continued)

(56) References Cited

U.S. PATENT DOCUMENTS 2,680,477 A * 6/1954 Schira, Jr. .......... B60K 15/0406
137/565.12
5,978,779 A * 11/1999 Stein ...................... G06Q 40/04
705/37
(Continued)

FOREIGN PATENT DOCUMENTS

CN 201225252 Y * 4/2009

OTHER PUBLICATIONS

English Translation of CN 2012/25252 Y obtained Apr. 24, 2020 (Year: 2020).*

*Primary Examiner* — Connor J Tremarche
(74) *Attorney, Agent, or Firm* — Winston Hsu (57) ABSTRACT

A portable inflation device of the present application includes an inflation pump body, an upper casing, a middle casing, a lower casing, a resilient component, and a resilient ventilation plug. The upper casing and the middle casing respectively seal two ends of the inflation pump body, and an air chamber is defined thereamong. An accommodating chamber is defined between the middle casing and the lower casing disposed outside the air chamber. An intake hole, a first ventilation hole and an exhaustion hole are respectively formed on the upper casing, the middle casing and the lower casing. The resilient ventilation plug disposed inside the accommodating chamber includes a perforated foam positioned between the first ventilation hole and the exhaustion hole and an sealing layer covering a surface of the perforated foam facing towards the first ventilation hole. The inflation device is small in volume, collapsible, portable, and easy to operate.

8 Claims, 6 Drawing Sheets

(51) Int. Cl.
*A41D 27/00* (2006.01)
*A43B 3/24* (2006.01)
*F04B 53/10* (2006.01)
*F04B 39/12* (2006.01)

(52) U.S. Cl.
CPC ............. *F04B 39/121* (2013.01); *F04B 53/10* (2013.01); *F04B 53/108* (2013.01); *F04B 53/1072* (2013.01)

(58) Field of Classification Search
CPC ....... F04B 53/108; A41D 27/00; A43B 3/248; F16K 13/00
See application file for complete search history.

(56) References Cited

U.S. PATENT DOCUMENTS

| | | | | |
|---|---|---|---|---|
| 6,004,178 A * | 12/1999 | Liu | ................... | B63C 9/155 441/88 |
| 6,120,264 A * | 9/2000 | Wang | ................... | A47C 27/081 417/478 |
| 6,805,267 B2 * | 10/2004 | Bougamont | ........ | B05B 11/0064 222/207 |
| 7,546,696 B1 * | 6/2009 | Acheson | ............. | A43B 13/203 36/29 |
| 2006/0045780 A1 * | 3/2006 | Pekar | .................... | F04B 33/00 417/437 |

\* cited by examiner

PORTABLE INFLATION DEVICE

BACKGROUND OF THE INVENTION

1. Field of the Invention

The invention relates to an inflation device, and more particularly, to a portable inflation device.

2. Description of the Prior Art

Inflatable apparatuses, such as Inflatable clothes, inflatable shoes and inflatable bags, are cushion apparatuses which can be buoyant on water, water-proof, soft and portable. Conventionally, inflatable apparatuses are applied in outdoor activities such as mountain climbing, camping and diving. However, conventional inflation devices for inflating the inflatable apparatuses are large in volume and inconvenient in storage and lack portability. Therefore, it is important to develop an inflation device with portability.

SUMMARY OF THE INVENTION

Therefore, it is an objective of the present application to provide an inflation device which is small in volume, collapsible, portable, and easy to operate.

To achieve the aforementioned objective, the present application discloses a portable inflation device which an inflation pump body, an upper casing, a middle casing, a lower casing, a resilient component, and a resilient ventilation plug. The inflation pump body is in a shape of a barrel structure with a surrounding flexible side wall. The upper casing for sealing an opening formed at an end of the inflation pump body and the middle casing is for sealing another opening formed at an another end of the inflation pump body. An air chamber is defined among the inflation pump body, the upper casing and the lower casing. An intake hole is formed on the upper casing and communicated with the air chamber. The lower casing is disposed outside the air chamber and fixed on the middle casing through a periphery of the lower casing. An accommodating chamber is defined between a middle portion of the lower casing and a middle portion of the middle casing. A first ventilation hole is formed on the middle casing and communicated between the air chamber and the accommodating chamber. An exhaustion hole is formed on the lower casing and communicated with the accommodating chamber. The resilient component disposed inside the air chamber. The resilient ventilation plug includes a perforated foam and an sealing layer. The perforated foam is disposed inside the accommodating chamber and positioned between the first ventilation hole and the exhaustion hole. A gap is formed between the perforated foam and an inner wall of the accommodating chamber. The sealing layer covers a surface of the perforated foam facing towards the first ventilation hole. When the resilient component and the air chamber are compressed, air in the air chamber presses away the sealing layer to flow through the first ventilation hole so that the air passes through the perforated foam and is exhausted out of the exhaustion hole for inflating an inflatable apparatus. When the resilient component is restored to an uncompressed status, the air chamber sucks air from an outer environment through the intake hole and is inflated, the perforated foam blocks communication between the first ventilation hole and the exhaustion hole, and the sealing layer seals the first ventilation hole.

According to an embodiment of the present application, the upper casing is detachably engaged with at least one of the middle casing and the lower casing.

According to an embodiment of the present application, the upper casing is detachably engaged with the middle casing. A rim of the upper casing encloses the inflation pump body. At least two engaging holes are disposed on the rim of the upper casing. A rim of the middle casing encloses the inflation pump body. At least two engaging protrusions corresponding to the engaging holes are disposed on the rim of the middle casing, and the engaging protrusions are engaged with the engaging holes when the portable inflation device is collapsed for storage.

According to an embodiment of the present application, at least one pressing protrusion is disposed on a surface of the lower casing away from the accommodating chamber. The portable inflation device further includes a base, a deflation pin, and a spring. The base is disposed outside the inflatable apparatus. A front surface of the base is detachably engaged with the lower casing. A rear surface of the base seals the inflatable apparatus. A second ventilation hole is formed on a middle portion of the base. A sealing encircling wall protrudes from the front surface of the base for enclosing the second ventilation hole. The deflation pin is movably inserted in the second ventilation hole. An end of the deflation pin is as a pressing portion located inside the sealing enclosing wall, and another end of the deflation pin is as a plugging portion. The spring sheathes the deflation pin and is compressed. An end of the spring is connected with the pressing portion, and another end of the spring is connected with a periphery of the second ventilation hole. When the base is detached from the lower casing, the plugging portion plugs the second ventilation hole on the rear surface of the base. When the base is engaged with the lower casing, the sealing enclosing wall seals a periphery of the exhaustion hole on the lower casing, the pressing protrusion presses the pressing portion of the deflation pin to compress the spring so that the plugging portion of the deflation pin is separated from the second ventilation hole for communicate the exhaustion hole and the second ventilation hole with an inflated chamber of the inflatable apparatus.

The portable inflation device further includes a protective holder holding the base and disposed inside the deflated apparatus. A front surface of the protective holder seals the deflated apparatus.

According to an embodiment of the present application, a plurality of hemispherical protrusions are circularly disposed on the front surface of the protective holder.

According to an embodiment of the present application, the inflation pump body includes a hollow bowl structure connected with the upper casing and a hollow cylinder structure connected with the middle casing. A diameter of the hollow bowl structure is gradually decreased to a diameter of the hollow cylinder structure along a direction from the upper casing to the middle casing.

According to an embodiment of the present application, the resilient component is a high-resilient perforated foam.

According to an embodiment of the present application, the perforated foam of the resilient ventilation plug is a high-resilient perforated foam, and the sealing layer is a plastic diaphragm.

According to an embodiment of the present application, a hanging hole is disposed on at least one of the middle casing and the lower casing, and a hanging rope is fastened through the hanging hole.

In contrast to the prior art, the present application utilizes configuration among the pump body, the upper casing, the middle casing and the lower casing to construct the inflation device with a compact structure for reducing overall volume of the inflation device. The resilient parts adopted in the inflation device can automatically recover from compression, which enhances an inflation rate and is effort-saving. The resilient ventilation plug further operates as a check valve to prevent the inflated air chamber from leakage. In addition, the base, the deflation pin and the spring adopted in the inflation device can ensure a sealing effect when the inflation device inflates the inflatable apparatus and effectively seal the inflated inflatable apparatus. Besides, the present application further provides the inflated inflatable apparatus with easy exhaustion operation. Therefore, the inflation device of the present application is convenient to collapse, portable, effective, and suitable for Inflatable apparatuses such as inflatable clothes, inflatable shoes, and inflatable bags.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
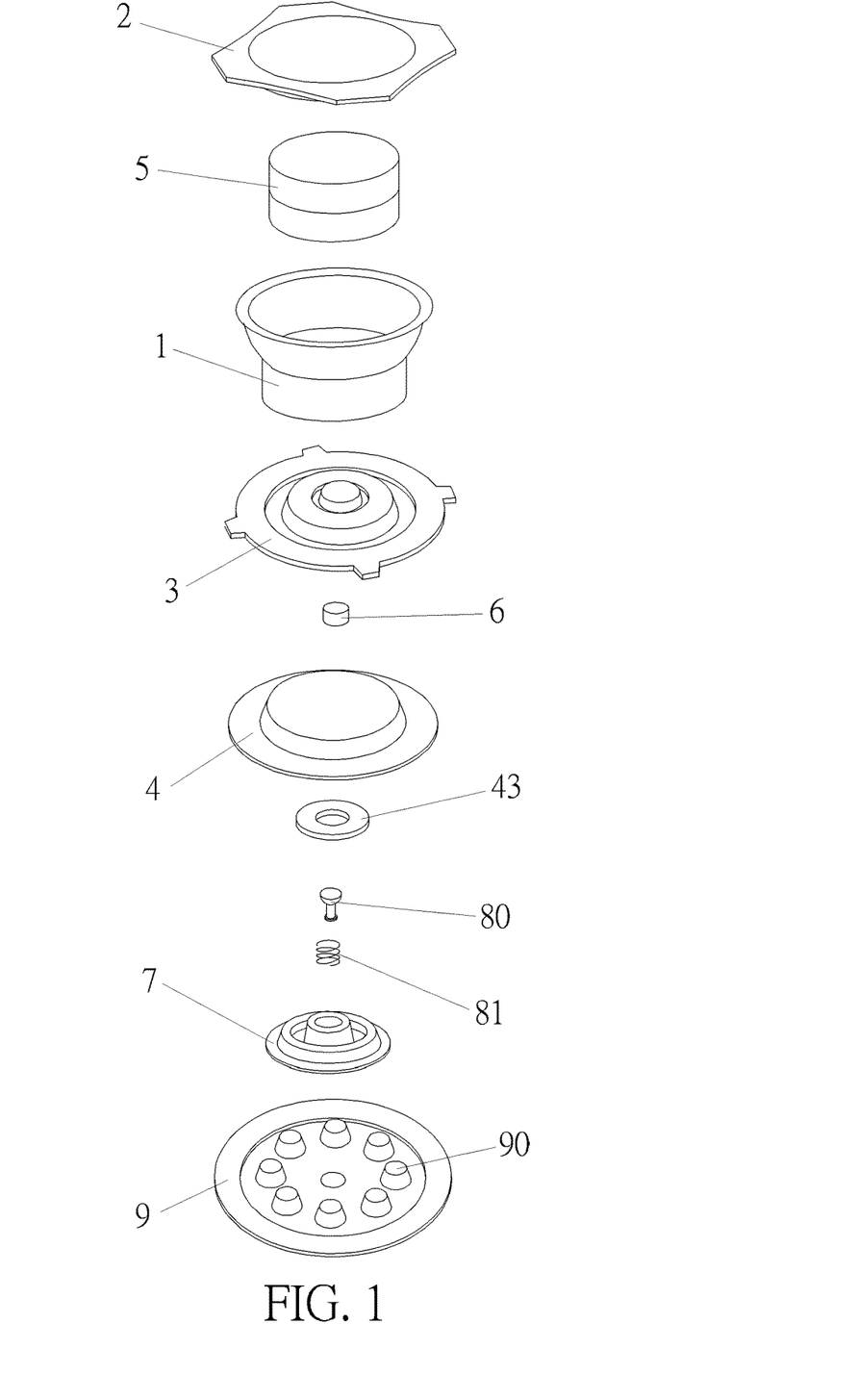
FIG. 1 is an exploded diagram of a portable inflation device according to an embodiment of the present application.
Figure 2:
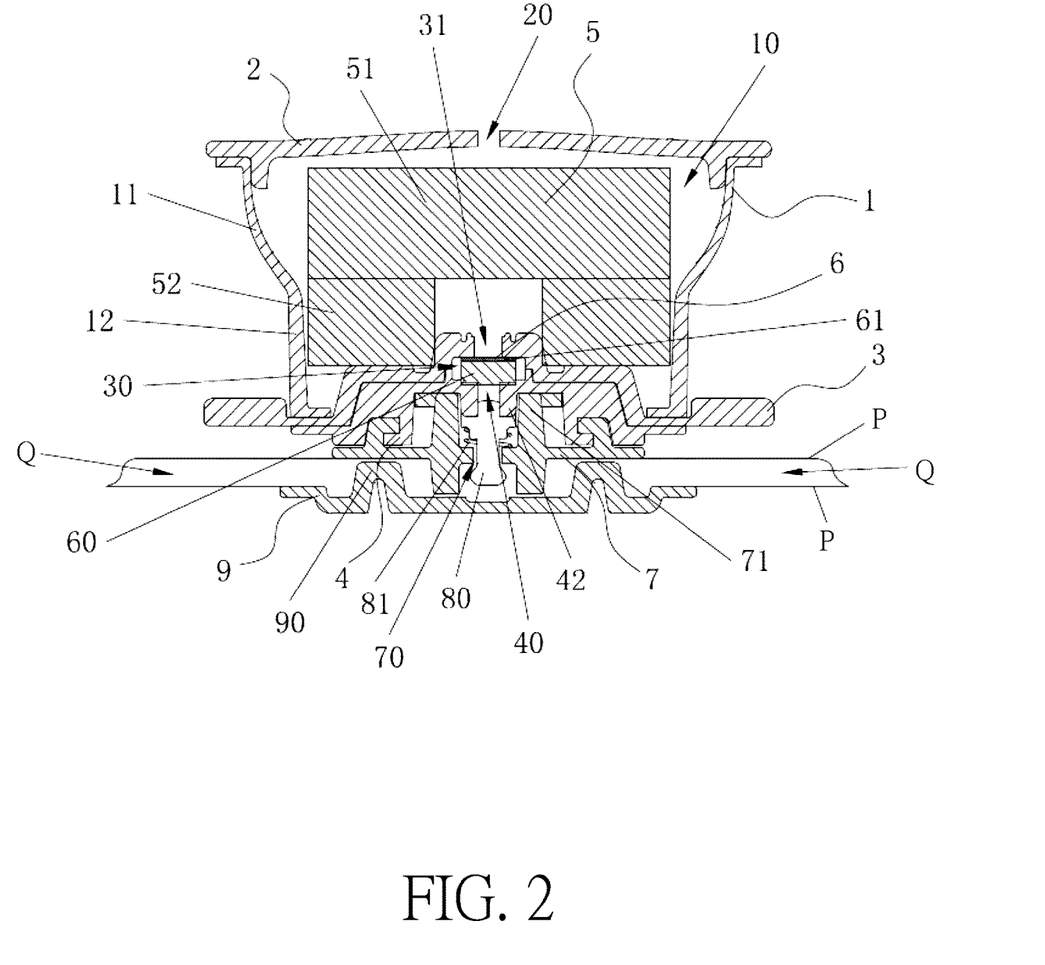
FIG. 2 is a sectional diagram of the portable inflation device according to the embodiment of the present application.

Please refer to FIG. 1 and FIG. 2. FIG. 1 is an exploded diagram of a portable inflation device according to an embodiment of the present application. FIG. 2 is a sectional diagram of the portable inflation device according to the embodiment of the present application. The portable inflation device of the present application includes a inflation pump body 1, an upper casing 2, a middle casing 3, a lower casing 4, a resilient component 5, a resilient ventilation plug 6, a deflation pin 80, a spring 81, and a protective holder 9. The inflation pump body 1, the upper casing 2, the middle casing 3, the lower casing 4, the resilient component 5, and the resilient ventilation plug 6 can be assembled to form a pump head of the portable inflation device of the present application.

Figure 3:
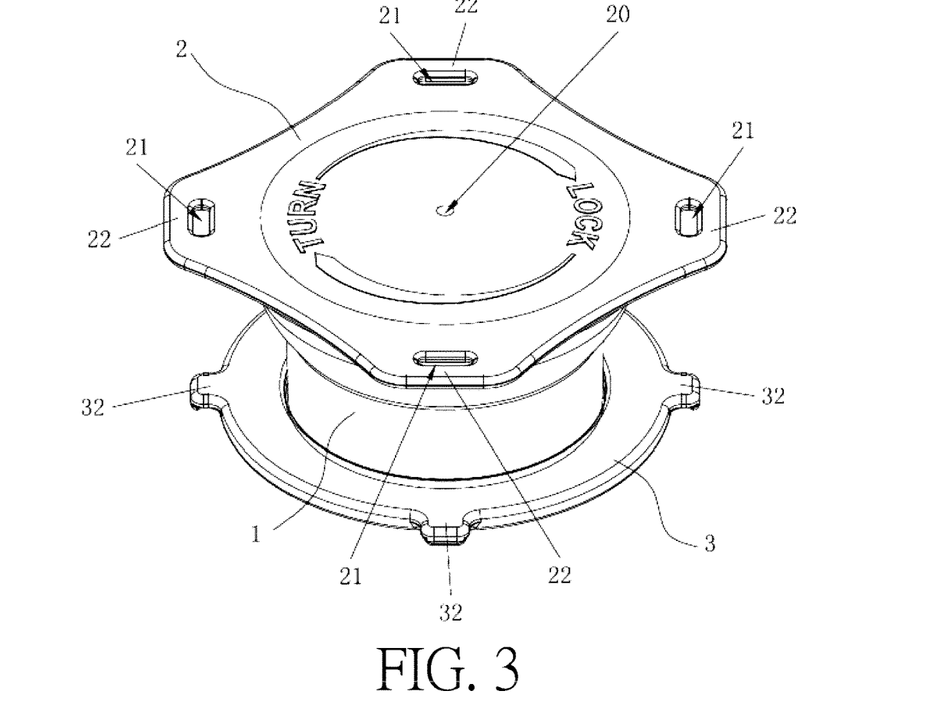
FIG. 3 is a schematic diagram of a pump head of the portable inflation device in a top view according to the embodiment of the present application.
Figure 4:
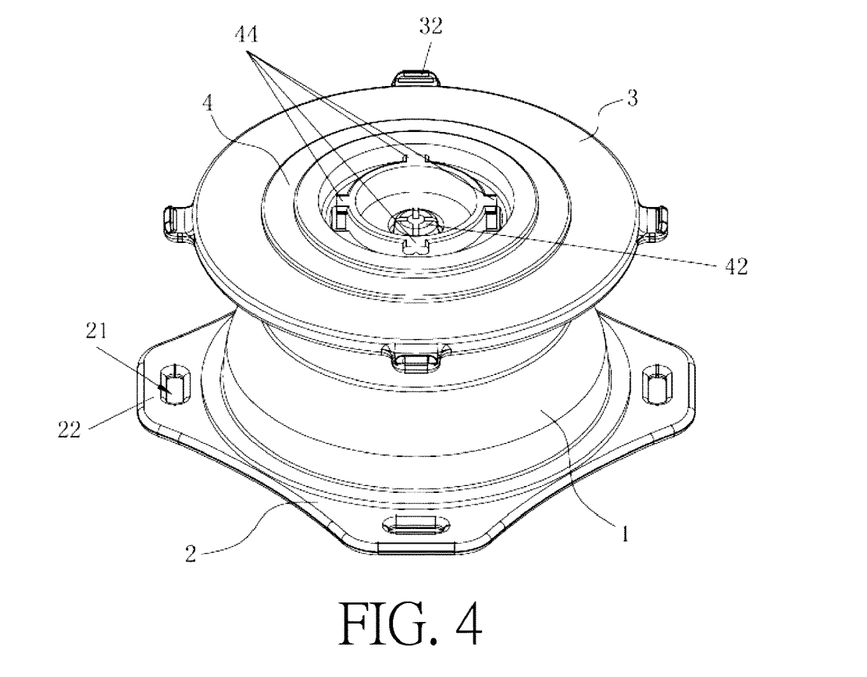
FIG. 4 is a schematic diagram of the pump head in a bottom view according to the embodiment of the present application.
Figure 5:
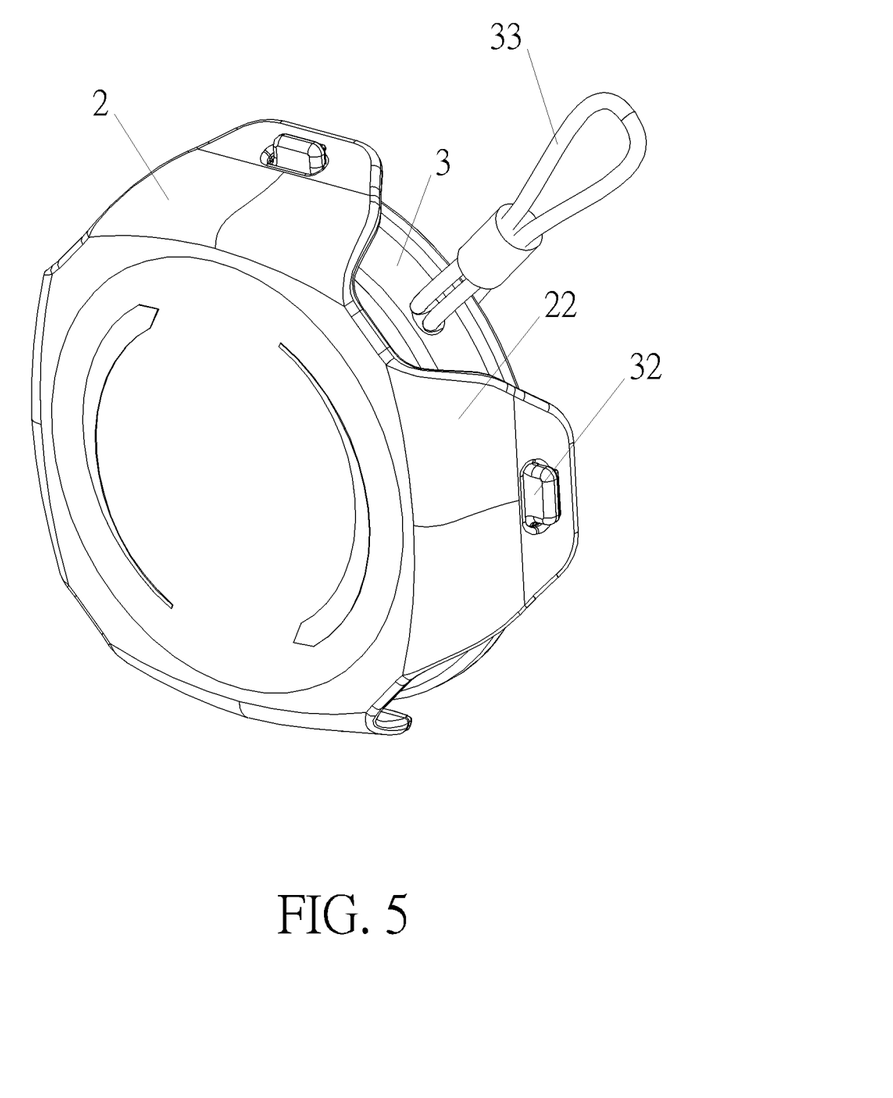
FIG. 5 is a schematic diagram of the collapsed pump head according to the embodiment of the present application.
Figure 6:
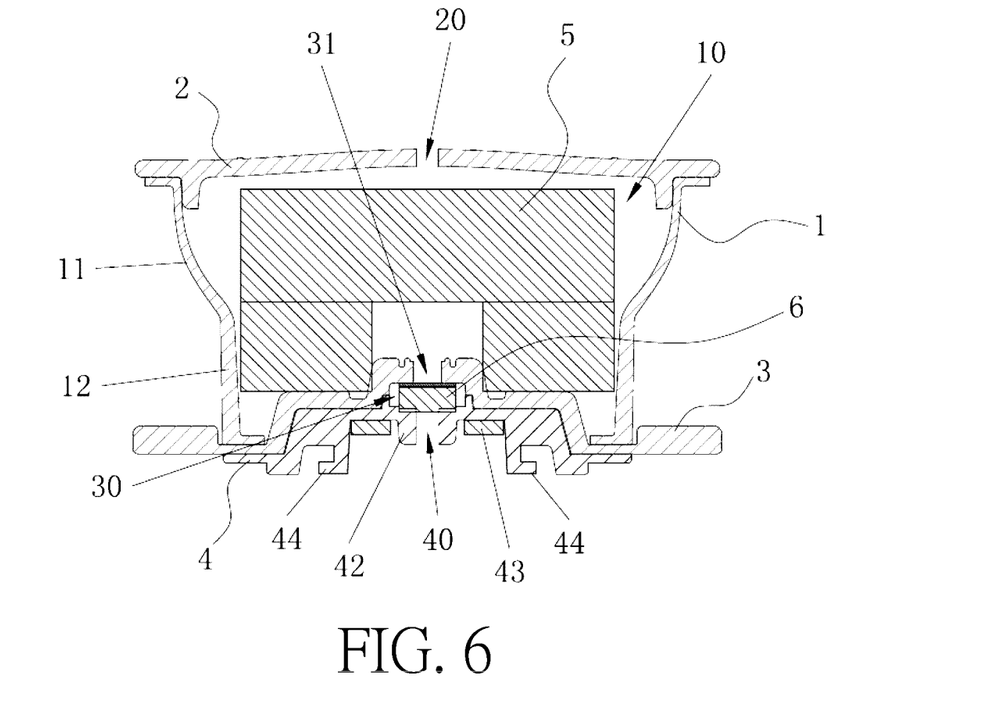
FIG. 6 is a sectional diagram of the inflated pump head according to the embodiment of the present application.
Figure 7:
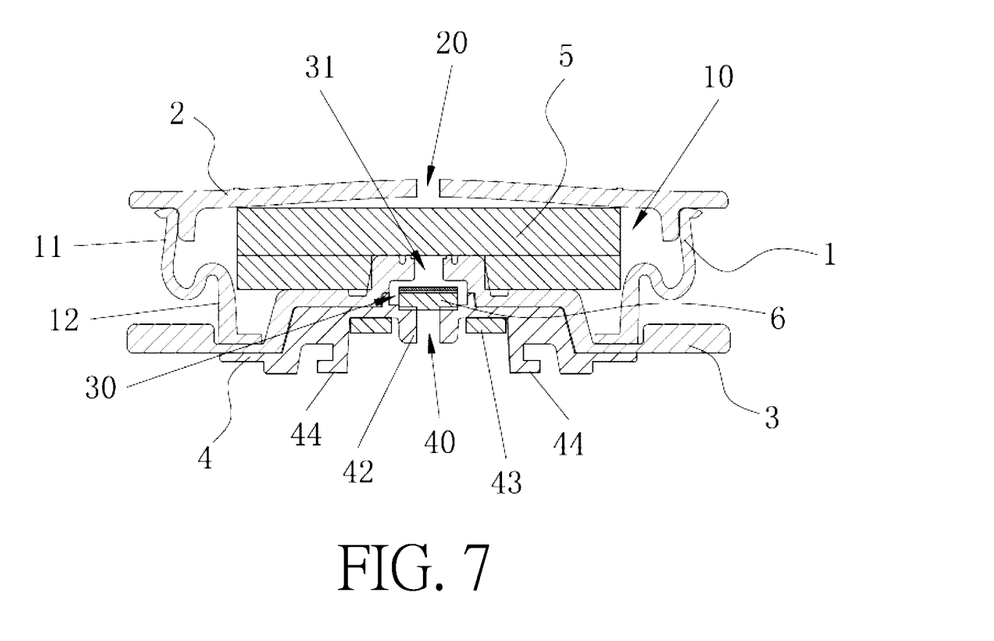
FIG. 7 is a sectional diagram of the deflated pump head according to the embodiment of the present application.

Please refer to FIG. 2 to FIG. 7. FIG. 3 is a schematic diagram of the pump head of the portable inflation device in a top view according to the embodiment of the present application. FIG. 4 is a schematic diagram of the pump head in a bottom view according to the embodiment of the present application. FIG. 5 is a schematic diagram of the collapsed pump head according to the embodiment of the present application. FIG. 6 is a sectional diagram of the inflated pump head according to the embodiment of the present application. FIG. 7 is a sectional diagram of the deflated pump head according to the embodiment of the present application.

As shown in FIG. 2, the inflation pump body 1 can be in a shape of a barrel structure with a surrounding flexible side wall. The upper casing 2 and the middle casing 3 respectively seal two openings formed at two ends of the inflation pump body 1. An air chamber 10 is defined among the inflation pump body 1, the upper casing 2 and the middle casing 3. The lower casing 4 is disposed outside the air chamber 10 and fixed on the middle casing 3 through a periphery of the lower casing 4. An accommodating chamber 30 is defined between a middle portion of the lower casing 4 and a middle portion of the middle casing 3. An intake hole 20 is formed on a middle portion of the upper casing 2 and communicated with the air chamber 10. A first ventilation hole 31 is formed on the middle portion of the middle casing 3 and communicated between the air chamber 10 and the accommodating chamber 30. An exhaustion hole 40 is formed on the lower casing 4 and communicated with the accommodating chamber 30.

Specifically, the inflation pump body 1 consists of two sections. One of the two sections is a hollow bowl structure 11 connected with the upper casing 2, and the other of the two sections is a hollow cylinder structure 12 connected with the middle casing 3. A diameter of the hollow bowl structure 11 is gradually decreased to a diameter of the hollow cylinder structure 12 along a direction from the upper casing 2 to the middle casing 3. As shown in FIG. 7, when the inflation pump body 1 is compressed, an intermediate portion of the inflation pump body 1 where the hollow bowl structure 11 and the hollow cylinder structure 12 connects with each other folds so that volume of the inflation pump body 1 can be effectively reduced for portability and easy storage. The inflation pump body 1 can be made of plastic material, such as PVC, TPU etc., which has benefits of light weight, flexibility, low cost and convenience in manufacturing.

A rim of the upper casing 2 is detachably engaged with a rim of the middle casing 3 or a rim of the lower casing 4 so that the inflation pump body 1 can be conveniently collapsed to reduce the volume of the inflation pump body 1 (or of the pump head).

According to the embodiment, the rim of the upper casing 2 is detachably engaged with the rim of the middle casing 3. Specifically, as shown in FIG. 3 and FIG. 4, the rim of the upper casing 2 encloses the inflation pump body 1, and at least two engaging holes 21 are formed on the rim of the upper casing 2. The rim of the middle casing 3 encloses the inflation pump body 1, and at least two engaging protrusions 32 corresponding to the engaging holes 21 are disposed on the rim of the middle casing 3. When the pump head (or the portable inflation device) is collapsed for storage, the engaging protrusions 32 are engaged with the engaging holes 21. According to another preferred embodiment, four extended flanges 22 can be extended from the rim of the upper casing 2. That is, two of the four extended flanges 22 disposed on the rim of the upper casing 2 are opposite to each other, and the other two of the four extended flanges 22 are also opposite to each other. Four engaging holes are respectively formed on the four extended flanges 22, and four engaging protrusions 32 corresponding to the four engaging holes 21 are disposed on the rim of the middle casing 3.

For portability and utility, a hanging hole can be disposed on the middle casing 3 or the lower casing 4. As shown in FIG. 5, a hanging rope 33 is threaded through and tied to the hanging hole. A pull piece or a pull ring can be disposed on the hanging rope 33. It should be noticed that the hanging rope 33 can be utilized to hang the pump head onto an inflation apparatus or other equipment.

When the pump head is utilized in an inflation process, the rim of the upper casing 2 is separated from the rim of the middle casing 3, and the pump head can be stretched to a maximum axial height, such as 30 mm. As shown in FIG. 5, when the pump head is collapsed, the extended flanges 22 of the upper casing 2 can be bended towards the middle casing 3 so that the engaging protrusions 32 of the middle casing 3 can engage with the engaging holes 21 of the extended flanges 22, which reduces the axial height of the pump head (along the axial direction of the inflation pump body 1), such as to substantially 15 mm. Therefore, the volume of the collapsed pump head can be half of the volume of the pump head before being collapsed.

A surface of the lower casing 4 facing away from the accommodating chamber 30 is an installation surface, and at least one pressing protrusion 42 is disposed on the installation surface. Specifically, the pressing protrusion 42 can be a protruded rim of the exhaustion hole 40 which protrudes away from the installation surface. For enhancing a sealing effect, a rubber washer 43 can further be disposed onto the installation surface and around the pressing protrusion 42.

It should be noticed that the upper casing 2, the middle casing 3, and the lower casing 4 can be made of plastic material, such as PVC, TPU etc., which has benefits of light weight, flexibility, low cost and convenience in manufacturing.

The resilient component 5 is disposed inside the air chamber 10 and can be a perforated foam, a sponge or a spring, but not limited to this. According to a preferred embodiment, the resilient component 5 is a high-resilient perforated foam. According to the embodiment, the resilient component 5 can further consist of a first foam layer 51 and a second foam layer 52. The first foam layer 51 is adjacent to the upper casing 2 and can be a high-resilient and low-density perforated foam. The second foam layer 52 is adjacent to the middle casing 3 and can be a high-resilient and low-density perforated foam.

The resilient ventilation plug 6 consists of a perforated foam 60 and a sealing layer 61. The perforate foam 60 is disposed inside the accommodating chamber 30 and positioned between the first ventilation hole 31 and the exhaustion hole 40. A gap is formed between the perforated foam 60 and an inner wall of the accommodating chamber 30. The sealing layer 61 covers a surface of the perforated foam 60 facing towards the first ventilation hole 31. The perforated foam 60 of the resilient ventilation plug 6 can be a high-resilient perforated foam, and the sealing layer 61 can be a plastic diaphragm, preferably, a TPU diaphragm.

As shown in FIG. 7, when the resilient component 5 and the air chamber 10 are compressed, air in the air chamber 10 presses away the sealing layer 61 to flow through the first ventilation hole 31 so that the air passes through the perforated foam 60 and is exhausted out of the exhaustion hole 40 for inflating an inflatable apparatus P. As shown in FIG. 6, when the resilient component 5 is restored to an uncompressed status, the air chamber 10 sucks air from an outer environment through the intake hole 20 and is inflated, the perforated foam 60 restores to an uncompressed status and blocks communication between the first ventilation hole 31 and the exhaustion hole 40, and the sealing layer 61 seals the first ventilation hole 31.

The base 7 is disposed outside the inflatable apparatus P and has a front surface and a rear surface. The front surface of the base 7 is detachably engaged with the lower casing 4, and rear surface of the base 7 seals the inflatable apparatus P. Specifically, the rear surface of the base 7 can be integrated to the inflatable apparatus P, via hot press plastic material, such as TPU, PVC etc., and processed by high-frequency induction heating, but not limited to this. According to another embodiment, the base 7 can be combined with the inflatable apparatus P via adhesive bonding.

A second ventilation hole 70 is formed on a middle portion of the base 7, and a sealing encircling wall 71 protrudes from the front surface of the base 7 for enclosing the second ventilation hole 70.

The deflation pin 80 is movably inserted in the second ventilation hole 70. An end of the deflation pin 80 is a pressing portion located inside the sealing enclosing wall 71, and another end of the deflation pin is a plugging portion.

The spring 81 sheaths the deflation pin 80 and is at a compressed status. An end of the spring 81 is a free end and connected with the pressing portion of the deflation pin 80, and another end of the spring 81 is connected with a periphery of the second ventilation hole 70.

When the base 7 is detached from the lower casing 4, the plugging portion of the deflation pin 80 plugs the second ventilation hole 70 on the rear surface of the base 7. When the base 7 is engaged with the lower casing 4, the sealing enclosing wall 71 seals a periphery of the exhaustion hole 40 on the lower casing 4, the rubber washer 43 seals an outer rim on a top portion of the sealing encircling wall 71, and the pressing protrusion 42 presses the pressing portion of the deflation pin 80 to compress the spring 81 so that the plugging portion of the deflation pin 80 moves away from the rear surface of the base 7 and is separated from the second ventilation hole 70 for communicate the exhaustion hole 40 and the second ventilation hole 70 with an inflated chamber Q of the inflatable apparatus P.

Figure 8:
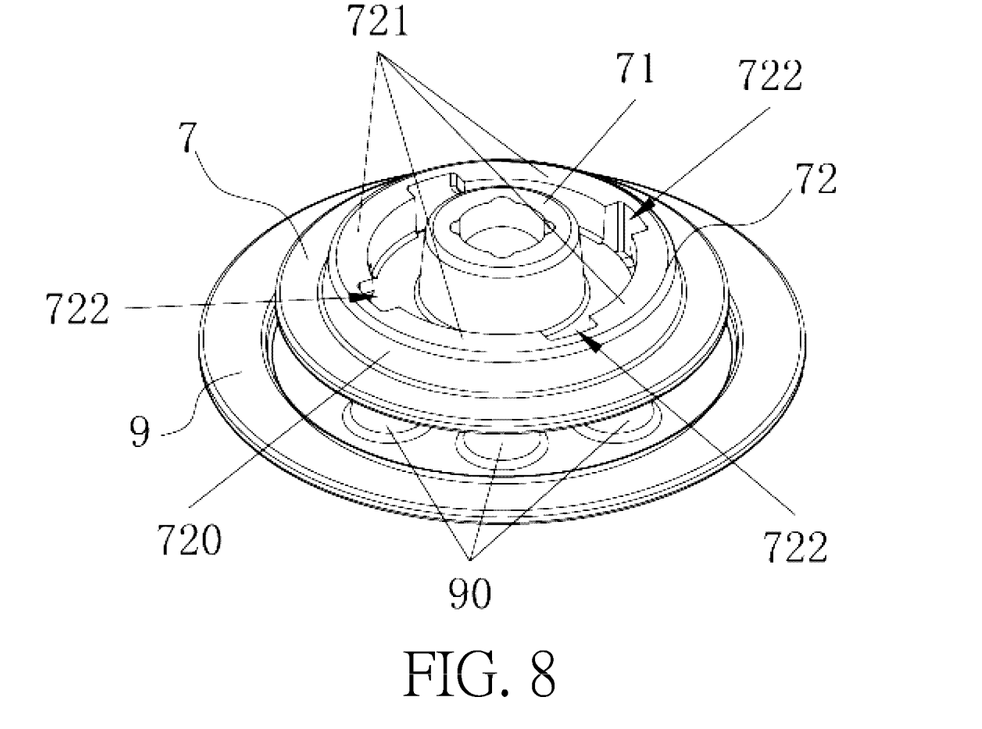
FIG. 8 is a schematic diagram of an assembly of a base and a protective holder according to the embodiment of the present application.

Please refer to FIG. 4 and FIG. 8. FIG. 8 is a schematic diagram of an assembly of the base 7 and the protective holder 9 according to the embodiment of the present application. Several methods can be utilized to engage the lower casing 4 with the base 7. For example, as shown in FIG. 4 and FIG. 8, engaging pins 44 can be disposed on the installation surface of the lower casing 4, and an engaging groove structure 72 corresponding to the engaging pins 44 can be disposed on the front surface of the base 7. When the engaging pins 44 are engaged with the engaging groove structure 72, the lower casing 4 is detachably engaged with the base 7.

According to a preferred embodiment, the four engaging pins 44 are disposed on the installation surface of the lower casing 4 and distributed around the pressing protrusion 42. A free end of each of the four engaging pins 44 is bended towards the rim of the lower casing 4. The engaging groove structure 72 is disposed on the front surface of the base 7 and includes a circular surrounding wall 720 and four locking pieces 721 disposed on the circular surrounding wall 720. The circular surrounding wall 720 surrounds the sealing encircling wall 71, and the four locking pieces 721 are spaced along an inner rim on a top portion of the circular surrounding wall 720. Four grooves 722 are formed on the engaging groove structure 72, wherein the four grooves 722 respectively corresponds to where the free ends of the four engaging pins 44 are, and each groove 722 is formed between the pair of adjacent locking pieces 721. Therefore, when the lower casing 4 is to be engaged with the base 7, the four engaging pins 44 are required to be aligned with the four grooves 722, and then the lower casing 4 can be pressed down so that the pressing protrusion 42 can press the pressing portion of the deflation pin 80 and the free ends of the four engaging pins 44 can be inserted into the four grooves 722. Next, the pump head can be rotated to lock the locking pieces 721 around the free ends of the engaging pins 44, which achieves engagement between the pump head and the base 7, as shown in FIG. 2. After inflation of the inflatable apparatus P is finished, the pump head can be rotated to restore the engaging pins 44 from the locking pieces 721 into the grooves 722 so that the engaging pins 44 can be disengaged and the pump head can be detached from the base 7.

Figure 9:
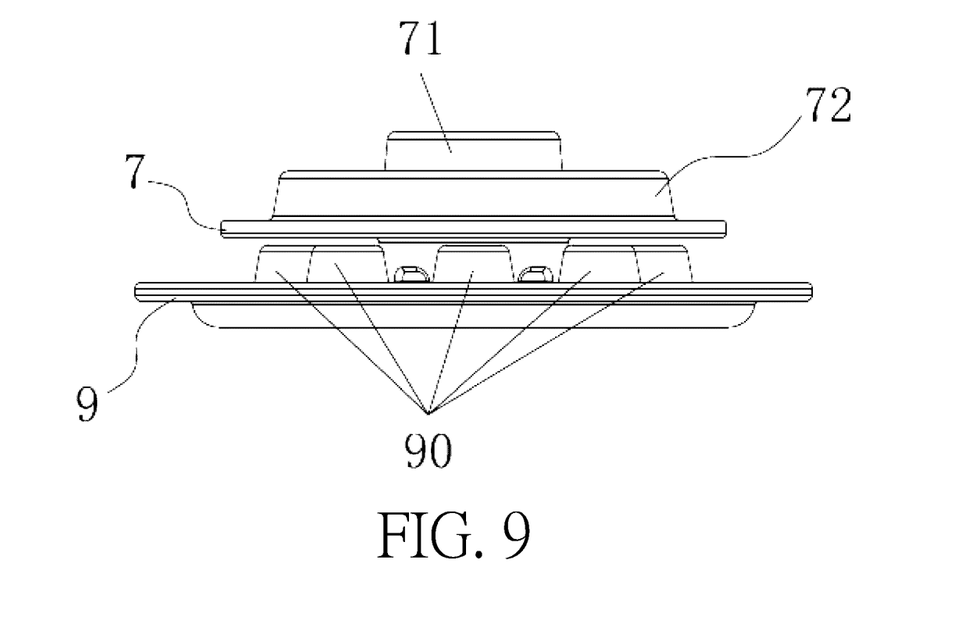
FIG. 9 is a side view of the assembly of the base and the protective holder according to the embodiment of the present application.

Please refer to FIG. 9. FIG. 9 is a side view of the assembly of the base 7 and the protective holder 9 according to the embodiment of the present application. As shown in FIG. 1, FIG. 2, FIG. 8, and FIG. 9, the protective holder 9 is disposed inside the inflatable apparatus P for holding the base 7, and the protective holder 9 includes a front surface and a rear surface. The front surface of the protective holder 9 seals the inflatable apparatus P. Specifically, the front surface of the protective holder 9 can be integrated to the inflatable apparatus P through adhesive binding or via hot press plastic material processed by high-frequency induction heating so as to seal the inflatable apparatus P with the front surface of the protective holder 9. Besides, a plurality of hemispherical protrusions 90 can further be circularly disposed and equally spaced on the front surface of the protective holder 9 so as to achieve better sealing effect. According to a preferred embodiment, eight hemispherical protrusions 90 can be disposed on the front surface, but not limited to this.

Detailed operational procedure for operating the portable inflation device includes the following steps:

Step 1: Insert the pump head to the base 7 and press down the upper casing 2 to compress the inflation pump body 1 and the resilient component 5 so that the air in the air chamber 10 flows through the first ventilation hole 31 and presses away the sealing layer 61 by compressing the perforated foam 60, which enables the air to enter into the accommodating chamber 30, flow through the perforated foam 60 and the exhaustion hole 40 and into a space encircled by the sealing encircling wall 71, and keep flowing through the second ventilation hole 70 and into the inflated chamber Q of the inflatable apparatus P for achieving inflation.

Step 2: Release the upper casing 2, which restores the resilient component 5 in the air chamber 10 and the perforated foam 60 to uncompressed statuses and increases the volume of the air chamber 10 to provide a negative pressure in the air chamber 10 that causes external air to flow into the air chamber 10 through the intake hole 20 as the restored perforated foam 60 blocks communication between the first ventilation hole 31 and the exhaustion hole 40, that is, the sealing layer 61 seals the first ventilation hole 31 so that the air inside the inflated chamber Q of the inflatable apparatus P is prevented from exhaustion.

Step 3: Repeat Step 2 and Step 3 until inflation of the inflatable apparatus P is completed and detach the pump head from the base 7 so that the pressing protrusion 42 stops pressing the pressing portion of the deflation pin 80 and the free end of the spring 81 stretches outwards from the sealing encircling wall 71 so as to move the plugging portion of the deflation pin 80 to plug and seal the second ventilation hole 70 on the rear surface of the base 7, which prevents the air inside the inflatable apparatus P from exhaustion. The pump head can be collapsed by engaging the upper casing 2 with the middle casing 3 and hung to equipment or facilities via the hanging rope 33 on the pump head.

Step 4: Press the pressing portion of the deflation pin 80 to compress the spring 81 so that the plugging portion of the deflation pin 80 moves away from the rear surface of the base 7 and separates from the second ventilation hole 70, which enables the air inside the inflated chamber Q of the inflatable apparatus P to be exhausted through the second ventilation hole 70 for achieving exhaustion.

In contrast to the prior art, the present application utilizes configuration among the pump body, the upper casing, the middle casing and the lower casing to construct the inflation device with a compact structure for reducing overall volume of the inflation device. The resilient parts adopted in the inflation device can automatically recover from compression, which enhances an inflation rate and is effort-saving. The resilient ventilation plug further operates as a check valve to prevent the inflated air chamber from leakage. In addition, the base, the deflation pin and the spring adopted in the inflation device can ensure a sealing effect when the inflation device inflates the inflatable apparatus and effectively seal the inflated inflatable apparatus. Besides, the present application further provides the inflated inflatable apparatus with easy exhaustion operation. Therefore, the inflation device of the present application is convenient to collapse, portable, effective, and suitable for Inflatable apparatuses such as inflatable clothes, inflatable shoes, and inflatable bags.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable inflation device, comprising:
   an inflation pump body in a shape of a barrel structure with a surrounding flexible side wall;
   an upper casing for sealing an opening formed at an end of the inflation pump body, a rim of the upper casing enclosing the inflation pump body, and at least two engaging holes being formed on the rim of the upper casing;
   a middle casing for sealing an another opening formed at an another end of the inflation pump body, an air chamber being defined among the inflation pump body, the upper casing and the middle casing, an intake hole being formed on the upper casing and communicated with the air chamber, the upper casing being detachably engaged with the middle casing, a rim of the middle casing enclosing the inflation pump body, at least two engaging protrusions corresponding to the engaging holes being disposed on the rim of the middle casing, and the engaging protrusions being engaged with the engaging holes when the portable inflation device is collapsed for storage;

a lower casing disposed outside the air chamber and fixed on the middle casing through a periphery of the lower casing, an accommodating chamber being defined between a middle portion of the lower casing and a middle portion of the middle casing, a first ventilation hole being formed on the middle casing and communicated between the air chamber and the accommodating chamber, an exhaustion hole being formed on the lower casing and communicated with the accommodating chamber;

a resilient component disposed inside the air chamber; and a resilient ventilation plug comprising:
a perforated foam disposed inside the accommodating chamber and positioned between the first ventilation hole and the exhaustion hole, a gap being formed between the perforated foam and an inner wall of the accommodating chamber; and
an sealing layer covering a surface of the perforated foam facing towards the first ventilation hole, wherein when the resilient component and the air chamber are compressed, air in the air chamber presses away the sealing layer to flow through the first ventilation hole so that the air passes through the perforated foam and is exhausted out of the exhaustion hole for inflating an inflatable apparatus, and when the resilient component is restored to an uncompressed status, the air chamber sucks air from an outer environment through the intake hole and is inflated, the perforated foam blocks communication between the first ventilation hole and the exhaustion hole, and the sealing layer seals the first ventilation hole.

2. The portable inflation device of claim 1, wherein at least one pressing protrusion is disposed on a surface of the lower casing away from the accommodating chamber, and the portable inflation device further comprises:
a base disposed outside the inflatable apparatus, a front surface of the base being detachably engaged with the lower casing, a rear surface of the base sealing the inflatable apparatus, a second ventilation hole being formed on a middle portion of the base, a sealing encircling wall protruding from the front surface of the base for enclosing the second ventilation hole;
a deflation pin movably inserted in the second ventilation hole, an end of the deflation pin being as a pressing portion located inside the sealing enclosing wall, another end of the deflation pin being as a plugging portion; and
a spring sheathing the deflation pin and being compressed, an end of the spring being connected with the pressing portion, and another end of the spring being connected with a periphery of the second ventilation hole;
wherein when the base is detached from the lower casing, the plugging portion plugs the second ventilation hole on the rear surface of the base, and when the base is engaged with the lower casing, the sealing enclosing wall seals a periphery of the exhaustion hole on the lower casing, the pressing protrusion presses the pressing portion of the deflation pin to compress the spring so that the plugging portion of the deflation pin is separated from the second ventilation hole for communicate the exhaustion hole and the second ventilation hole with an inflated chamber of the inflatable apparatus.

3. The portable inflation device of claim 2, further comprising a protective holder holding the base and disposed inside the deflated apparatus, and a front surface of the protective holder sealing the inflatable apparatus.

4. The portable inflation device of claim 3, wherein a plurality of hemispherical protrusions are circularly disposed on the front surface of the protective holder.

5. The portable inflation device of claim 1, wherein the inflation pump body comprises a hollow bowl structure connected with the upper casing and a hollow cylinder structure connected with the middle casing, and a diameter of the hollow bowl structure is gradually decreased to a diameter of the hollow cylinder structure along a direction from the upper casing to the middle casing.

6. The portable inflation device of claim 1, wherein the resilient component is a perforated foam.

7. The portable inflation device of claim 1, wherein the perforated foam of the resilient ventilation plug is a perforated foam, and the sealing layer is a plastic diaphragm.

8. The portable inflation device of claim 1, wherein a hanging hole is disposed on the middle casing, and a hanging rope is fastened through the hanging hole.

* * * * *